United States Patent [19]

Haselden

[11] 4,318,870

[45] Mar. 9, 1982

[54] DISTILLATION PLATE

[76] Inventor: Geoffrey G. Haselden, 12, High Ash Dr., Leeds, England

[21] Appl. No.: 96,466

[22] Filed: Nov. 21, 1979

[30] Foreign Application Priority Data

Nov. 22, 1978 [GB] United Kingdom ............... 45535/78
Nov. 22, 1978 [GB] United Kingdom ............... 45680/78
Mar. 28, 1979 [GB] United Kingdom ............... 10805/79

[51] Int. Cl.$^3$ ............................................... B01F 3/04
[52] U.S. Cl. .............................. 261/114 JP; 202/158; 261/114 R
[58] Field of Search ...................... 261/114 R, 114 JP; 202/158

[56] References Cited

U.S. PATENT DOCUMENTS

| | | | |
|---|---|---|---|
| 3,047,278 | 7/1962 | Streuber | 261/114 JP |
| 3,294,379 | 12/1966 | Desperier | 261/114 JP |
| 3,589,689 | 6/1971 | English | 261/114 R |
| 3,807,143 | 4/1974 | Dunn | 261/114 R X |
| 3,864,439 | 2/1975 | Tanigawa et al. | 261/114 R |
| 3,937,769 | 2/1976 | Strigle, Jr. et al. | 261/114 R X |
| 4,171,335 | 10/1979 | Planovsky et al. | 261/114 JP X |

Primary Examiner—Richard L. Chiesa
Attorney, Agent, or Firm—Saidman & Sterne

[57] ABSTRACT

A baffle system for use on a plate for mass transfer operations comprises at least one channel, the surface of the channel through which a two-phase mixture of liquid and vapor leaves the channel having a plurality of holes. A deflector is immediately adjacent to each hole, and the deflector is in line to deflect the two-phase mixture towards one end of the channel. A liquid return zone is defined by the space between two channels and laterally adjacent to each other. Disengaged liquid from the two-phase mixture collects in the liquid return zones and passes through slots in the channel sides to re-enter the channel. The baffle system has an inlet weir which blocks off one end of the or each two-phase channel, so that inlet liquid is fed to the liquid return zones. An outlet weir blocks off the other end of the or each two-phase channel and the liquid return zones.

7 Claims, 16 Drawing Figures

DISTILLATION PLATE

The invention relates to a baffle system for use on a plate for mass transfer operations.

The principle of distillation is that when a liquid containing two or more volatile components is boiled, the composition of the vapour is in general different from that of the liquid. It is therefore possible to separate components from one another.

Various types of equipment can be used to bring together vapour and liquid for mass transfer operations, in particular plate or packed columns. Plate columns comprise plates superposed to each other. The plates may be perforated, so that vapour introduced at the column base can pass up the column. Liquid is introduced at the top of the column, and passes down the column, normally flowing in alternate directions across the plates. Each plate has a weir system, comprising an inlet and exit weir, so that the liquid can be retained on the plate and the vapour is caused to bubble through it.

It is known to use two types of weir. The first type is used in small columns, where the weir is formed from the downcomers. The downcomers, which are usually circular, are extended down towards the plate, so that they are at a suitable height to act as a weir. A seal is placed at the bottom of each downcomer, so that vapour is prevented from rising up the downcomer.

The second type of weir is used in larger columns, and is known as a rectangular chord weir. This particular type of weir is a flat sheet which cuts off a part of the plate. It is possible that several downcomers may be used flush with the flat sheet. However, it is also possible that one downcomer, corresponding to the cross-sectional area of the cut-off part of the plate, may be used. A liquid seal at the bottom of the downcomer(s) can be provided by an inlet chord weir. The cross-sectional area of the cut-off part of the plate i.e. the part of the plate located behind the weir may be 15 to 20% of the total plate area.

Exit weirs are often placed a short distance from the last row of perforations on the sieve plate. This is to ensure that the liquid which is necessarily held up by the weir can be disentrained from the vapour to allow the downcomers to receive only clear liquid. This means that essentially vapour-free liquid is fed to the inlet weir on the next plate.

Distillation plates depend for their function on the mass transfer which occurs between the rising vapour and the dispersed liquid supported on the plate.

In the process of dispersing vapour through a liquid on a perforated plate, different flow patterns and dispersion forms arise according to the flow conditions, e.g. the vapour and liquid flow rates, the system properties, the height of outlet weir, the physical properties of the liquid and vapour, and the plate geometry, namely the form and separation of the plate perforations.

Distillation plates are designed to allow vapour to bubble up through a layer of liquid on the plate while the liquid flows across. The liquid is held as a dynamic dispersion on the plate by the vigorous action of the vapour bubbles, thereby enabling very intimate contact to occur between vapour and liquid for efficient mass transfer.

One of the most widely used plates consists of a horizontal uniformly-perforated metal sheet. The percentage free area is usually in the range 3 to 15%. Liquid enters the plate through one or more inlet downcomers, and is retained on the plate by a weir system. The liquid flows over one or more exit weirs, and flows down outlet downcomers to the next plate below. Downcomers can form part of the plate. The liquid can flow alternatively in opposite directions across the plate, though there can be other liquid flow regimes, such as the liquid flowing to a central downcomer in the plate.

The object of a good plate design is to achieve a high efficiency of mass transfer at high loadings. There are basically four flow regimes on plates—bubble flow, cellular flow, froth and spray. These flow regimes are met in the foregoing order as the vapour velocity increases. A transition between regimes is not sharp, and it may not be possible to observe some regimes under certain conditions. It may also be possible to have two or more regimes coexisting.

In practice, it has been observed that as the vapour loading is increased, the behaviour of the liquid dispersion on the plate becomes increasingly erratic so that any instant vapour is surging through some areas of the plate at a high rate whilst other areas may have no vapour flow. When this happens, liquid sloshes around the plate, which leads to transverse ocillatory waves across the column. The explanation of this erratic behaviour is that the rising vapour bubbles entrain liquid and hence impart an upward flow to the liquid.

At low vapour loadings, the liquid can drain back between the rising vapour bubbles and sustain the circulation. However, as the vapour loading increases, this steady circulation can no longer happen and it is replaced by a transient liquid return mechanism. Liquid accumulates in some regions of the dispersion until it achieves a sufficient density to drain under gravity, whilst other regions become denuded of liquid and vapour rises preferentially in these regions. Large bubbles or "vapour voids" are therefore formed. The location of these different flow regions is continually changing in a more or less regular oscillatory manner. The effect is reduced mass transfer between the vapour and liquid phases, reduced point efficiency and increased liquid entrainment (such entrainment is detrimental to mass transfer) with increasing vapour flow. It is therefore necessary to reduce the formation of vapour voids. This can be done by ensuring that the liquid from the froth flows back to the plate floor.

A baffle system has been shown in "The Transactions of the Institution of Chemical Engineers" (1973) 51, 188, and "The Chemical Engineer" (1975) July/August, which provides a liquid return zone into the plate. The system uses vertical baffles consisting of thin plates supported on edge at intervals across the plate. The baffles are fixed in a direction which is substantially parallel to the liquid flow across the plate. Liquid drainage, back onto the plate, is assisted by the baffles, since the draining liquid is no longer bounded by rising vapour bubbles on all sides. The baffles also prevent the development of liquid sloshing and transverse oscillatory waves. The baffles are supported so that the gap between them is wider at the top, i.e. the edge furthest from the plate, than at the bottom, and they are also supported clear of the plate by a gap of about the same size as the lower gap separating the baffles.

It has been found that it is possible to achieve a simultaneous reduction of the hydraulic gradient and of liquid back-mixing on the plate whilst achieving a further improvement of mass transfer at close tray spacings for high vapour and liquid loadings.

According to the present invention, a baffle system for use on a plate for mass transfer operations comprises at least one channel, the surface of said channel through which a two-phase mixture of liquid and vapour leaves the channel having a plurality of holes, a deflector immediately adjacent to each hole, and said deflector being aligned to deflect the two-phase mixture in a direction towards one end of the channel.

The invention further consists in a baffle system wherein the or each channel is gabled, the surface through which the two-phase mixture of liquid and vapour leaves the channel having a plurality of holes, a deflector immediately adjacent to each hole and said deflector being aligned to deflect the two-phase mixture in a direction both along the plate towards one end of the channel and down towards the floor of the plate.

Accordingly, it is possible for the direction of the two-phase mixture to be adjusted depending on the duty, so that with high liquid loadings the angle would favour flow along the plate and at low liquid loadings, the direction could be mostly, or even completely, downwards.

When the baffle channels are in use, a liquid return zone is defined by the space between two channels laterally adjacent to each other.

The invention further consists in a baffled plate wherein the baffling is provided by the baffle system comprising channels according to the invention.

By means of the invention, it is possible to have better mass transfer and therefore higher point efficiencies. The flow of vapour is preferentially from the centre region of the channel where the two phases (i.e. vapour and liquid) mix. The vapour flow promotes an internal recirculation of liquid within the two-phase channel, giving more intimate contact between vapour and liquid and therefore better mass transfer.

The dispersion in the two-phase channels is very dense and turbulent because liquid is fed into it rapidly from the drainage channel through slots provided, and because the gabling at the apex of the channel promotes some internal recirculation of liquid within the two-phase channel. Also, because the deflectors direct the liquid from the dispersion in a downward direction, a substantial part of the momentum in the rising of dispersion is used to promote external recirculation via the drainage channels. Furthermore the streams of dispersion emerging from the downward inclined holes in adjacent channels will impinge on each other and promote further mass transfer.

By means of the invention, the baffle system has provision for higher liquid and vapour loadings without the difficulties of liquid entrainment and hydraulic gradient. Also, the degree of liquid backmixing on the plate will be reduced. This will lead to a higher Peclet Number and therefore increased plate efficiency.

It is possible with the invention to have specific mechanical features which cheapen the construction of large columns by permitting large unsupported plate spans with thin gauge material. The mechanical design of the baffle system is very strong, whether the channels are separately joined to the plate or integral with the plate. The flexing of large distillation plates is a recognised problem which could be cured by this means. It would also probably be desirable to use baffle channels of sufficiently thick material so that a plank placed across them will support the weight of a man.

The invention further consists in a baffle system for use on a plate for mass transfer operations comprising at least one two-phase channel in which vapour and liquid are intimately mixed, liquid return zones for enabling liquid to flow back onto the plate, the liquid return zones being defined by the space between two channels laterally adjacent to each other, an inlet weir which blocks off one end of the or each two-phase channel, so that inlet liquid is fed to the liquid return zones, and an outlet weir which blocks off the other end of the or each two-phase channel and the liquid return zones.

Because the stiffness imparted by the baffle system allows thin gauge material to be used, it is possible to use smaller diameter perforations in the plate and these are also beneficial in promoting improved mass transfer.

The invention will now be described by way of example with reference to the accompanying drawings, in which.

Figure 1:
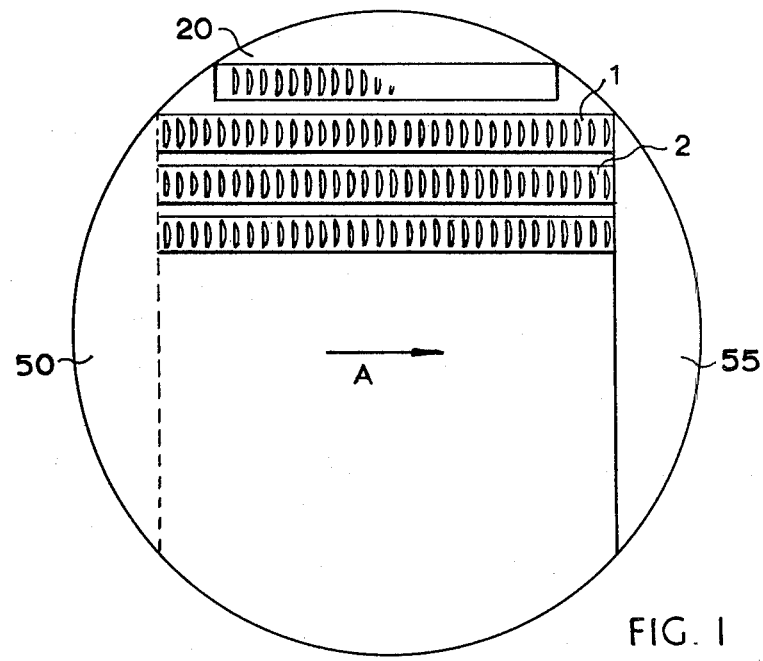
FIG. 1 shows a plan view of a sieve plate incorporating the invention.

FIG. 1 shows a plan view of a sieve plate 20 having channels 1 and 2. The liquid flows across the plate in the direction of the arrow A from the inlet downcomer 50 to the exit downcomer 55. It must be appreciated that FIG. 1 shows a schematic plan view of a sieve plate and its associated downcomer arrangements.

Figure 2:
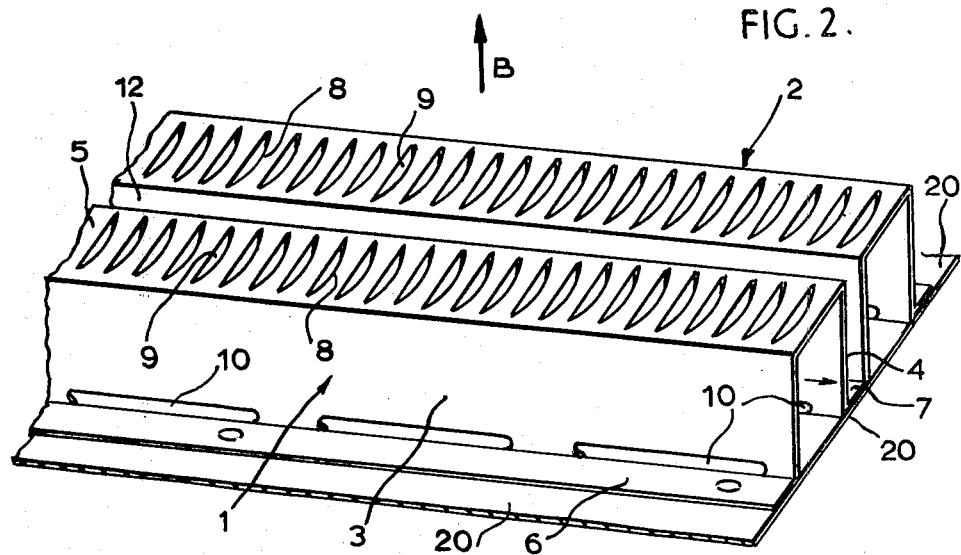
FIG. 2 shows a perspective view of two baffle channels.

Two channels 1 and 2 are shown in FIG. 2. By way of example, the nearest of the two channels (Channel 1) shown in perspective will be considered. The channel is defined by two sides 3 and 4, a roof 5 and two flanges 6 and 7. The flanges are used to join the channel to the plate 20, e.g. a sieve plate (when the channel is integral with the sieve plate, the flanges do not exist). The channel can be spot welded or riveted to the sieve plate along the flanges 6 and 7.

The channel 1 is substantially rectangular in cross-section. When the channel is made independently of the sieve plate, the sides 3 and 4 may be spot welded or riveted to the roof 5 along fold-lines 11 and 12. The shape of the channel may also be obtained by folding or pressing a single sheet of suitable material into the desired shape.

Figure 3:
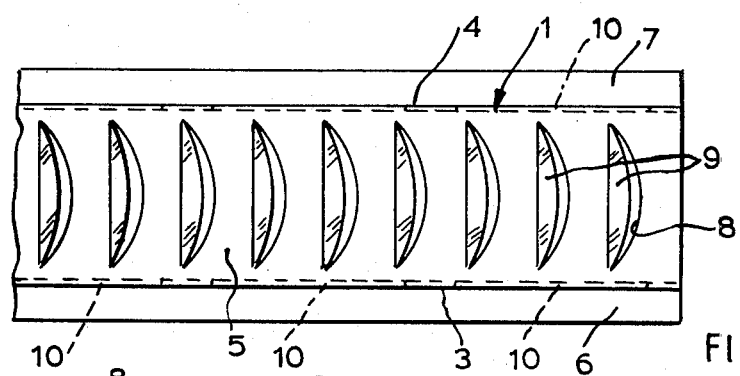
FIG. 3 shows a plan view of one baffle channel.
Figure 4:
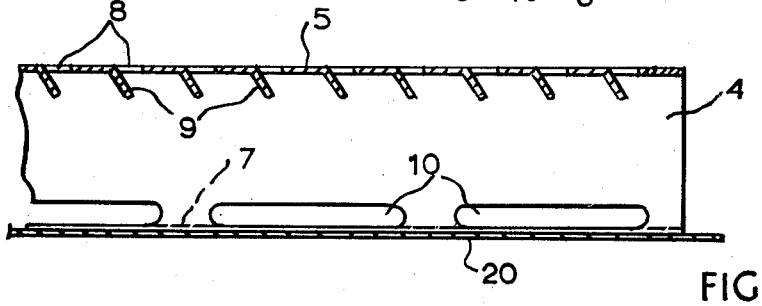
FIG. 4 shows a longitudinal section of one baffle channel.

The roof of the channel 5 has holes 8 punched into the material. The shape of the holes are similar to those found on a cheese grater. The flap of material 9 which results from the punching operation is used as a deflector for the two-phase mixture of vapour and liquid. FIGS. 3 and 4 show a plan and a side view respectively of a channel.

Vapour rises up through the sieve plate 20 and enters the channel 1 (FIG. 2). Liquid flows across the plate, shown by the arrow A, through the channel 1. As the vapour enters the channel, it entrains liquid and thereby produces a froth of a two-phase mixture which normally fills the channel.

The two-phase mixture is carried up through the roof of the channel by the rising vapour. The object of the deflector plates 9 by each hole is to deflect the two-phase mixture towards one end of each channel. In practice, the mixture will be deflected towards the outlet weir of each channel. The result is that some of the rising two-phase mixture emerging from each hole is deflected towards the outlet weir. Additional mass transfer and drainage of the liquid phase back to the plate 4 occurs with the impingement of the two-phase mixture on the deflector plate 9.

A disadvantage of the conventional sieve plate and weir system is that a hydraulic gradient develops across the plate. There is more liquid on the plate immediately adjacent to the inlet downcomer than there is near the outlet weir at the other end of the plate. Consequently the vapour preferentially passes up through the liquid of least depth on the plate, since there is a lower pressure head at that point than at the inlet downcomer end of the plate. Therefore there is not sufficient contact between the two phases and excessive entrainment. Weeping may also occur.

As the two-phase mixture passes through the holes, there is a slight expansion which promotes disengagement of liquid from vapour. Separation of liquid and vapour occurs above the roof 5 of the channel 1. Liquid then collects in liquid return zones 12. These zones are defined by the space formed between two adjacent channels. The deflector plates 9 have deflected the two-phase mixture towards the outlet weir end of the channel. The disengaged liquid therefore moves towards the outlet weir end of the plate. This therefore helps to reduce the hydraulic gradient across the plate and to equalise the level of liquid across the plate. The vapour proceeds to pass up the column. Thereby the object is achieved of creating a deliberate concentration of vapour flow into certain zones and of liquid flow into certain other zones, enabling the liquid to return to the plate via the liquid return zones where it is protected from the foaming environment.

The disengaged liquid collects in the liquid return zones 12 and accelerates downwards, under gravity, between the sides of each adjacent channel before discharging onto the plate. Considering FIG. 2, there are slots 10 cut at intervals along the lower edge of both sides of each channel. The liquid passes through the slots and re-enters the channel, where further mass transfer is promoted in the intimately mixed rising liquid and vapour within the channel.

Any form of construction which achieves the protected return paths for liquid flowing back to the floor of the plate may be employed. The baffle system comprising the channels may reach the full distance from inlet weir to outlet weir, and be in a construction which extends the full width of the column, or it may be built up out of modules, each module covering part of the area of the plate.

Figure 5:
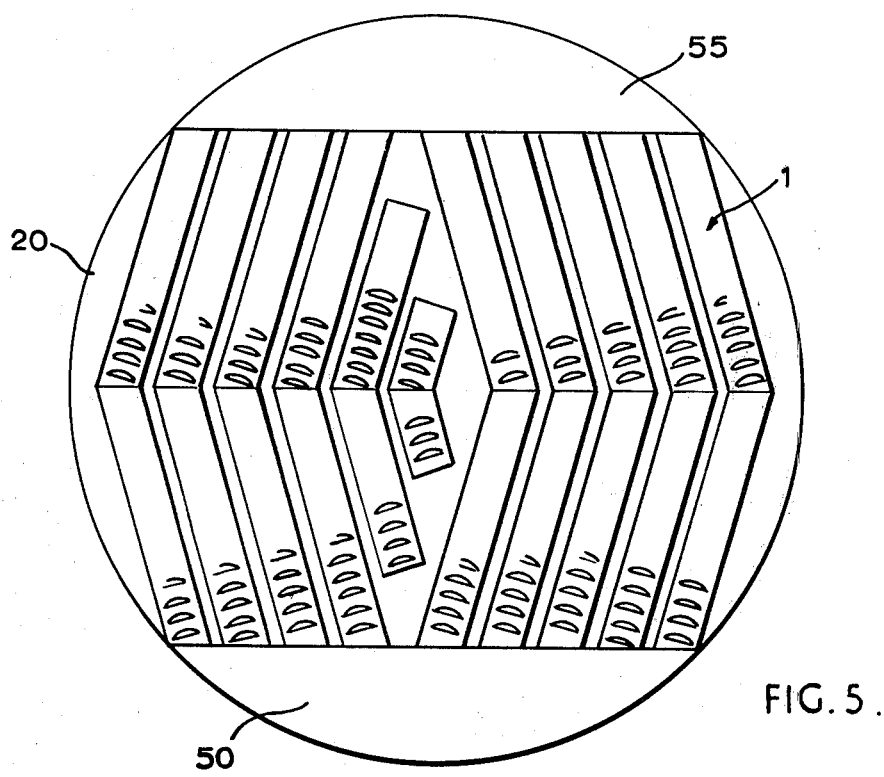
FIG. 5 shows an alternative plate layout.

A further embodiment of the invention is shown in FIG. 5, which shows a plan view of the channel arranged in a herring-bone pattern on the plate. The alternative direction of the baffles in FIG. 5 largely eliminates the dead spaces between the column wall by initially directing a liquid outward and then directing it inwards again.

Figure 6:
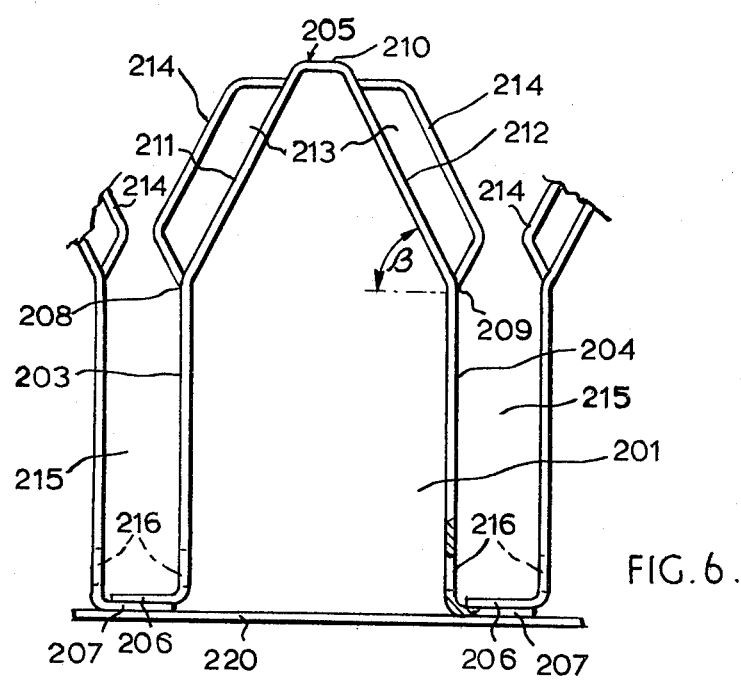
FIG. 6 shows an end view of a baffle channel.

FIG. 6 shows an end view of a baffle panel, bounded on either side by similar channels. The channel is defined by two sides 203 and 204, a roof portion 205 and two flanges 206 and 207. The flanges are used to join the channels to the plate 220, e.g. a sieve plate (when the channel is integral with the sieve plate, the flanges do not exist). The channel can be spot welded or riveted to the sieve plate along the flanges 206 and 207.

The channel sides 203 and 204 are bent along foldlines 208 and 209, so that the roof portion 205 is gabled. The roof portion 205 has a small surface 210, flat or curved, which is substantially parallel to the sieve plate when the channel is joined to the plate.

When the channel is made independently of the sieve plate, it may be formed by pressing and folding a single sheet of suitable material into the desired shape, which may be a single channel or an assembly of parallel channels formed side by side.

The sides 211 and 212 of the roof portion 205 converge upwardly and have holes 213 punched into the material. The shape of the holes is similar to those found on a cheese grater. The flap of material 214 which results from the punching operation is used as a deflector for the two-phase mixture of vapour and liquid.

Figure 7:
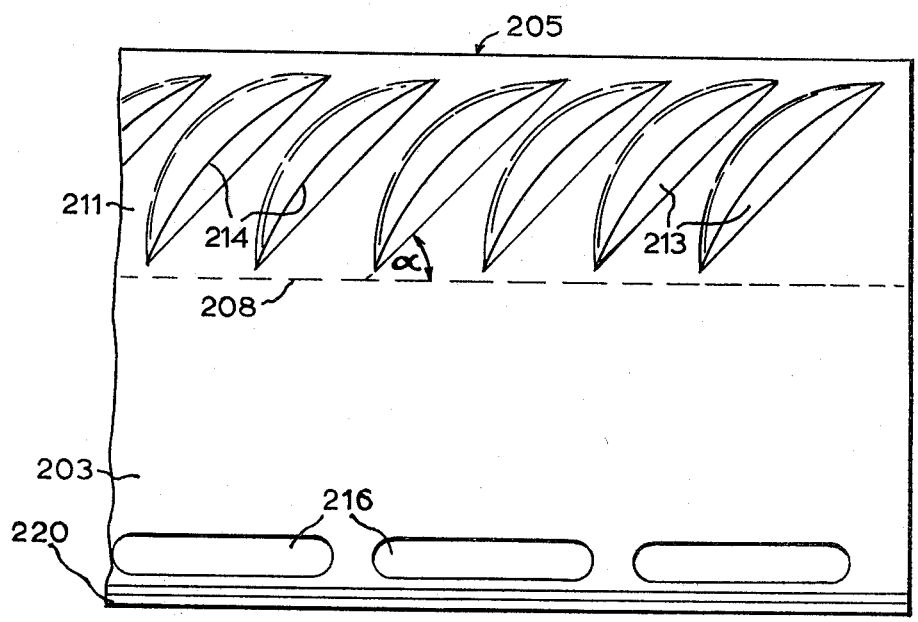
FIG. 7 shows a side elevation of a baffle channel.

Vapour rises up through the sieve plate 220 and enters the channel 201 (FIGS. 6 and 7). Liquid flows across the plate through the channel 215. As the vapour enters the channel it entrains liquid and thereby produces a two-phase dispersion or froth which normally fills the channel.

The two-phase mixture is carried out through the rows of holes in the roof of the channel by the rising vapour. The object of the deflector plates 214 by each hole is to deflect the two-phase mixture both towards the outlet weir end of each channel and downwards towards the sieve plate four 220. Deflection along the plate eliminates the problems of hydraulic gradient across the tray. Deflection downwards promotes recirculation with the desired dense froth properties. It also reduces the dispersion height above the baffles and so allows closer tray spacings for a given vapour loading or higher vapour loadings for a given tray spacing.

Each hole has a major dimension defined by its front edge. The angle of deflection is changed by varying the angle $\alpha$ (see FIG. 7) which the front edge of the hole makes with the longitudinal dimensions of the channels which are disposed horizontally, and to a lesser extent by varying the gable angle $\beta$ (see FIG. 6). As the angle $\alpha$ is reduced the liquid is thrown progressively in a downward direction. Increasing $\alpha$ throws the liquid towards the outlet weir. For very low liquid loadings the angle $\alpha$ could be made zero, in which case pairs of holes, or more numerous assemblies of holes could be punched in rows, or pointing essentially downwards. For a given value of $\alpha$, the effect of decreasing the angle $\beta$ will be to incline the flow more along the plate and less in a downward direction. The choice of angles and spacings can be optimised for a given duty.

The total flow area through the inclined holes should be made about equal to the flow area up through the two-phase channel 201 so that the plate pressure drop is kept low. As the two-phase mixture passes through the hole there is a slight expansion which promotes disengagement of liquid from vapour. Separation of liquid and vapour occurs above the level of the roof 205 of the channel 201. Liquid then collects in liquid return zones 215. These zones are defined by the space formed between two adjacent channels. It may also be of advantage to incline the walls 203 and 204 slightly inwards so that the drainage channels 215 are wider at the top than at the bottom in order to minimise the entrainment of bubbles in the externally recirculated liquid. As with the embodiment shown in FIGS. 1, 2, 3 and 4, slots 216 are cut at intervals along the lower edge of both sides of each channel. The liquid passes through these slots and re-enters the channel, where further mass transfer is promoted in the intimately mixed rising liquid and vapour within the channel.

The baffle system is preferably used with an underflow inlet weir, which communicates only with the liquid drainage channels 215. The ends of the baffles reach to the face of the weir.

Figure 8:
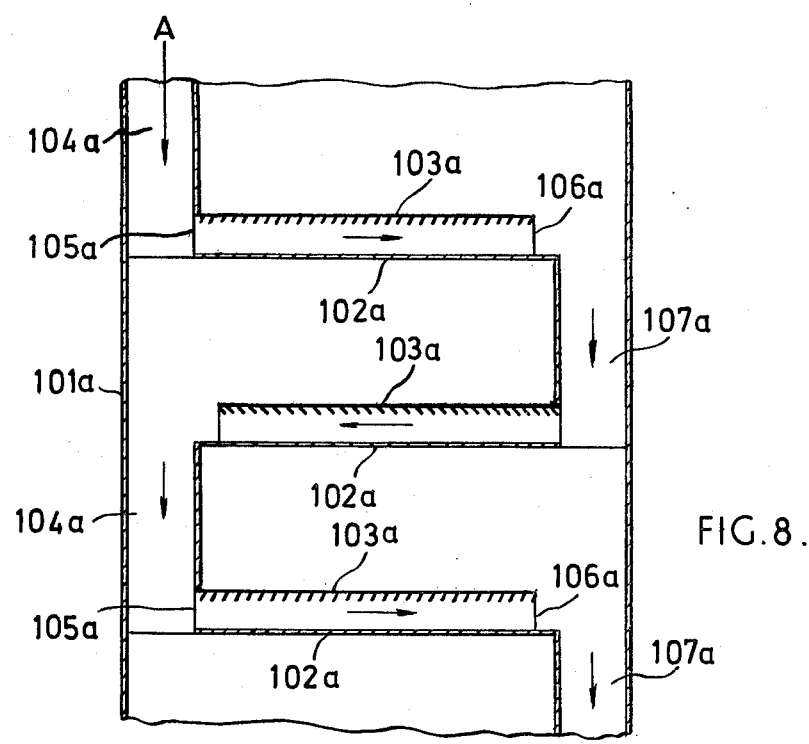
FIG. 8 shows a schematic cross-section of a column having baffled plates.

FIG. 8 shows a schematic cross-section of a column 101a having baffled sieve plates 102a. The baffling is provided by the channels 103a. Liquid from the plate above passes down an inlet downcomer 104a onto the plate 102a. The liquid flows over or through the inlet weir 105a, and then crosses the plate in the channel 103a. Liquid then flows over the outlet weir 106a and passes down the outlet downcomer 107a to the plate below. The direction of liquid is shown by arrows A.

Figure 9:
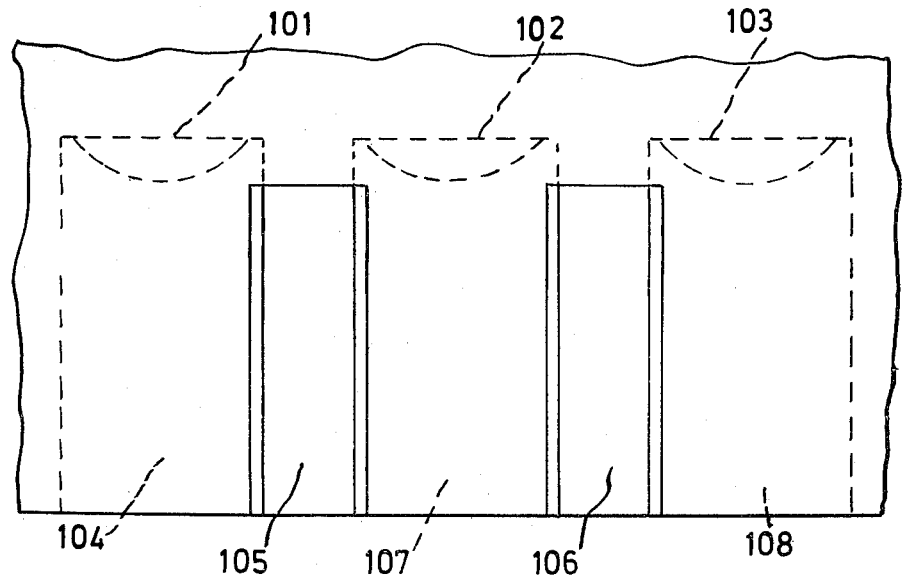
FIG. 9 shows an end elevation of a first embodiment of an inlet weir.

An embodiment of an inlet weir is shown in FIG. 9. The weir consists of a metal plate 104, which will form part of the downcomer, adjacently positioned against the end of channels 101, 102 and 103. The weir can be spot welded or riveted to the channel ends. It must be appreciated that the channels extend across the plate, and that in practice there may be more than three channels on the plate. A liquid return zone is defined by the space between two channels laterally adjacent to each other.

Figure 11:
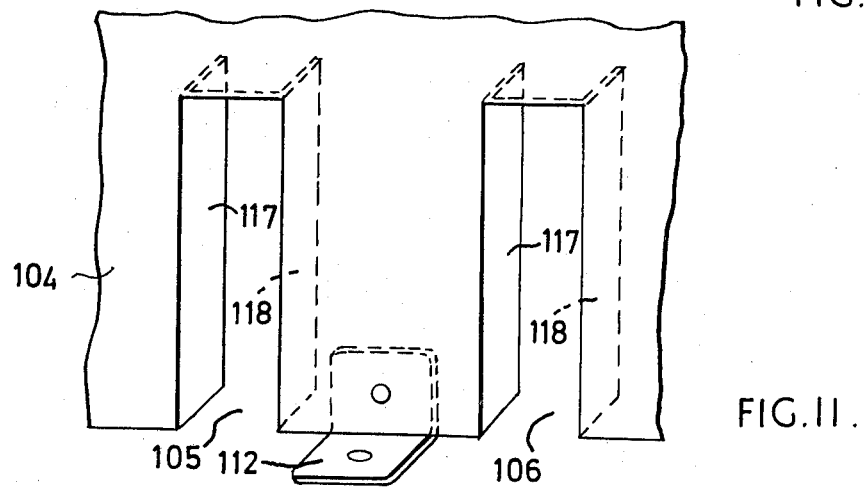
FIG. 11 shows a means for securing an inlet weir to a seive plate.

The metal weir plate 104 is slit and bent, as shown in FIGS. 9 and 11, to form slots 105 and 106 at regular intervals along the plate. The slots match or correspond to the liquid return zones. The teeth 107 and 108 block the two-phase channels 101, 102 and 103, so that the inlet liquid cannot pass into these channels. The inlet liquid is allowed to pass into the liquid return zones between the channels.

Figure 10:
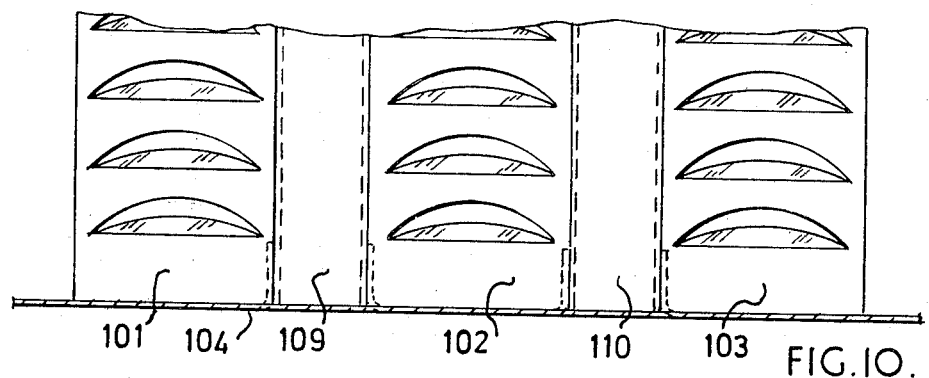
FIG. 10 shows a plan view of an inlet weir.

FIG. 10 shows a plan view of an inlet weir. Two liquid return zones 109 and 110 are defined between three channels 101, 102 and 103. The channels are blocked off by the flat surface of the weir plate, and the inlet liquid has therefore to pass into the liquid return zones.

FIG. 11 shows a means of securing an inlet weir to a sieve plate. The metal weir plate 104 can be secured to the sieve plate either by a fixing bracket or a tab 112.

Figure 12:
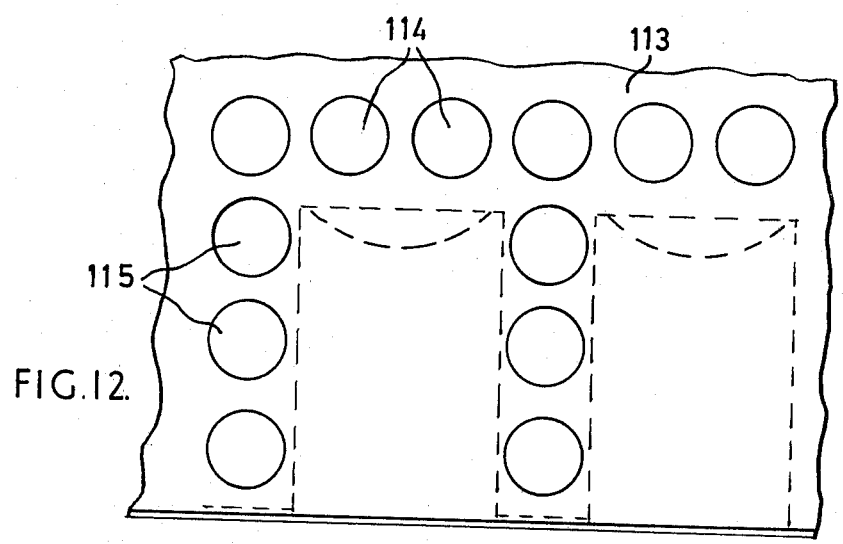
FIG. 12 shows an end elevation of a second embodiment of an inlet weir.

A further embodiment of the inlet weir is shown in FIG. 12. The metal weir plate is a continuous sheet 113 drilled with a pattern of holes. The pattern of of holes consists of a line of holes 114 adjacent to one of the long edges of the metal weir plate with lines of similar shape and size holes 115 at regular intervals extending away from the row of holes 114 towards the base of the weir plate. The lines of holes 115 extending towards the weir plate base and occurring at regular intervals along the weir plate correspond to the liquid return zones. The area of plate between each line of holes 115 blocks off the two-phase channels. Therefore, inlet liquid is fed to the liquid return zones via the lines of holes 114 and 115. The weir plate is adjacently positioned against the ends of the channels and it may be spot welded or riveted to the channel end. The diameter of the holes is less than the width of the liquid return zones. If the liquid load is low, the line of holes 114 may be omitted.

Figure 13:
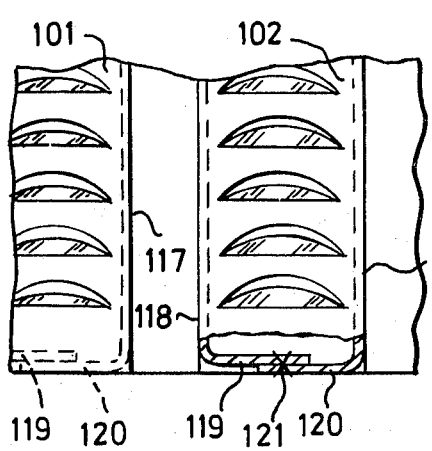
FIG. 13 shows a plan view of a third embodiment of an inlet weir.
Figure 14:
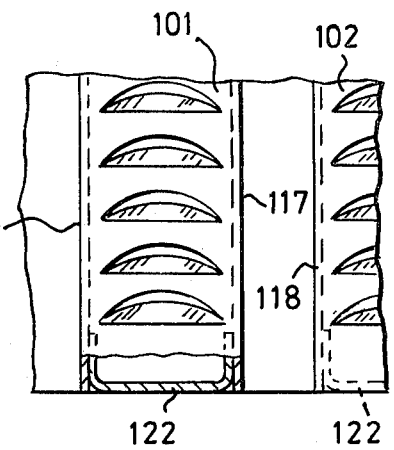
FIG. 14 shows a plan view of a fourth embodiment of an inlet weir.

FIGS. 13 and 14 show further embodiments of an inlet weir. The walls 117 and 118 of the channels 101 and 102 are extended beyond the end of each channel. The extensions 119 and 120 are then bent to meet or overlap each other, so that each channel is blocked off. The extensions 119 and 120 are preferably spot welded or riveted together 121. This weir design would be used in combination with a flat downcomer which terminated somewhat below the height of the baffles and adjacent to them.

In FIG. 14, the channels 101 and 102 are blocked off by a separate filler piece 122. This can be either made of a resilient material and sprung into the channel openings, or it can be made of a less resilient material and attached to the inside walls 117 and 118 of channels 101 and 102 by spot welding or riveting.

There is an outlet weir at the opposite end of each channel to the inlet weir. The outlet weir is required to largely or completely block off the ends of the two-phase channels. The outlet weir should also partly or wholly block off the liquid return zones between the channels. The dispersed liquid phase on each sieve plate is retained on the plate by the inlet and outlet weirs. The outlet weirs blocks off the ends of the two-phase channels so the dispersed liquid phase in each channel is entrained by the rising vapour, and the two-phase mixture is then forced to pass up through holes located in an upper surface of each channel, in order to promote better mass transfer.

Figure 15:
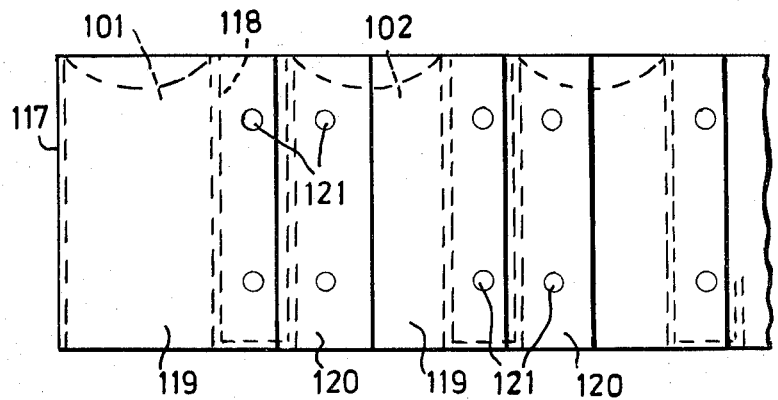
FIG. 15 shows an end elevation of an outlet weir.
Figure 16:
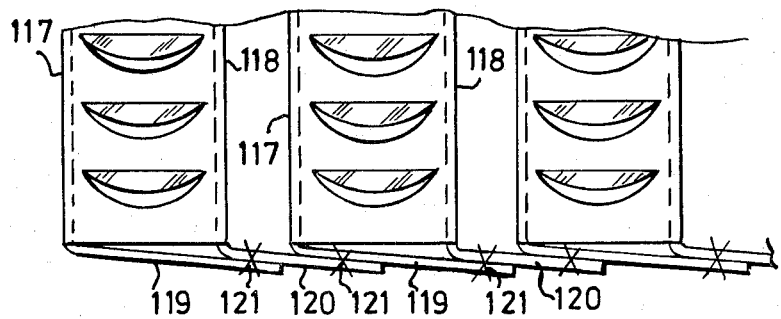
FIG. 16 shows a plan view of the outlet weir.

FIG. 15 shows an end elevation of an outlet weir. The walls 117 and 118 of the channels 101 and 102 are extended away from the ends of the channels. The extensions 118 and 119 are then bent in a direction perpendicular to the channels, so that extensions block off the two-phase channels and liquid return zones. This is shown in plan view in FIG. 16. Extensions can be spot welded or riveted together 121.

A similar effect from an outlet weir can be obtained by using a flat metal plate across the ends of the channels. The metal plate can be attached to the ends by either brackets or tabs or by spot welding or riveting. It may also be beneficial in practice to castellate the upper edges of the outlet weir, so that the liquid return zones have lower weirs than the two-phase channels.

The baffle system may also be used with other more conventional forms of inlet and outlet weirs. The advantages of this plate system will also apply to gas absorption columns.

I claim:

1. In combination,
   (a) a mass transfer plate for combining vapor and liquid to form a two-phase mixture; and
   (b) a baffle system comprising:
      (i) a series of elongated spaced channels within which said two-phase mixture is formed, each channel having a pair of side walls attached to and extending upwardly from said plate and defining a fluid flow path beginning at said plate and extending upwardly between said side walls;
      (ii) a first series of apertures formed in each channel, the associated fluid flow path extending out of the associated channel through said first series of apertures;

(iii) deflector means attached to said first series of apertures for deflecting a portion of said two-phase mixture in a direction longitudinally along the channels; and (iv) second apertures formed in the side walls of each channel at a position below said first apertures and proximal to said plate for allowing liquid separated from said two-phase mixture to re-enter the channels; and (v) further including liquid return zones defined by the space between laterally adjacent spaced channels for enabling liquid disengaged from said two-phase mixture to pass from said first apertures through said second apertures into said laterally adjacent channels.

2. The combination as set forth in claim 1 and further wherein each of said deflector means deflects said two-phase mixture downward of, as well as longitudinally along, the associated channel.

3. The invention as defined in claim 1 and further including an inlet weir means for feeding liquid to one end of said liquid return zones and blocking off one end of each of said channels, and outlet weir means for blocking off the other end of each of said liquid return zones.

4. The invention as defined in claim 3 wherein said inlet weir means includes slots spaced at regular intervals to align with said liquid return zones.

5. The combination as defined in claim 3 wherein said inlet weir means comprises an elongated continuous sheet of material drilled with a pattern of apertures, the pattern consisting of a first series of apertures extending longitudinally along the material and a second series of apertures spaced at regular intervals to align with said liquid return zones, said second series of apertures extending away from said first series of apertures.

6. The invention as defined in claim 3 wherein said inlet weir means is formed from the walls of at least one of said spaced channels, said walls being extended beyond the end of the associated channel, said extended walls being bent to meet or overlap each other.

7. The combination as set forth in claim 3 wherein said outlet weir means is formed from the walls of said spaced channels, said walls extending away from the ends of the associated channel, the walls being bent perpendicular to the longitudinal extent of said associated channel whereby the extended walls block off the associated channel and liquid return zones.

* * * * *